April 12, 1966   R. B. READE   3,246,273
YOKE HELD COIL SUPPORT FOR ELECTRICAL REACTOR
Filed Dec. 5, 1963

Inventor,
Richard B. Reade,
by Gilbert P. Tarlton
His Attorney.

Inventor,
Richard B. Reade,
by His Attorney.

April 12, 1966  R. B. READE  3,246,273
YOKE HELD COIL SUPPORT FOR ELECTRICAL REACTOR
Filed Dec. 5, 1963

Inventor,
Richard B. Reade,
by [signature]
His Attorney.

United States Patent Office 3,246,273
Patented Apr. 12, 1966

3,246,273
YOKE HELD COIL SUPPORT FOR ELECTRICAL REACTOR
Richard B. Reade, Guelph, Ontario, Canada, assignor to Canadian General Electric Company, Limited, Ontario, Canada, a corporation under the Companies Act of Canada
Filed Dec. 5, 1963, Ser. No. 328,369
8 Claims. (Cl. 336—219)

This invention relates to electrical reactors and more particularly to the core structure for reactors.

EHV is an abbreviation for extra high voltage, but the dividing line between high voltage and extra high voltage as used in connection with commercial frequency alternating current electric power transmission systems has not been precisely defined or agreed upon. For the purposees of this invention, the dividing line can be considered as 230 kilovolts. The upper limit of EHV is still less clearly defined as EHV systems are continually being constructed and designed for ever higher voltages, the highest such voltage to date being approximately 800 kilovolts.

As is well known a long transmission line has a relatively high capacitance, and as a result an increase in the A.C. voltage to the EHV level applied to such a line may cause the line charging current to rise to an intolerable value. Hence some means must be applied to keep this current down. A shunt reactor, as the term is used herein, is an inductive winding adapted to be connected across or in shunt with a high voltage or EHV transmission line, its principal purpose being to neutralize the line charging current. In order that a shunt reactor will have a high magnetizing current, it does not have a ferromagnetic core such as used in conventional stationary induction apparatus, and consequently it is sometimes called a coreless reactor.

A problem with EHV shunt reactors of large physical size is that the magnetic flux near the ends of a reactor winding or coil deviates from an axial direction to a cross direction relative to the axis of the coil. This cross flux interacts with the current in the adjacent conductor turns of the coil to produce high axial mechanical compression of the coil structure and sets the structure into vibration of destructive amplitudes. Such compressive forces are also high enough to damage known forms of insulation.

Cross fluxing may be eliminated or minimized by avoiding the use of a magnetic core in a coil window and by providing a wide ferromagnetic yoke at each end of the coil, that is, providing a high permeability magnetic circuit adjacent the end faces of the coil externally thereof. These yoke members serve to straighten out the magnetic flux in the coil, causing it to assume an axial direction. However, the magnetic yoke members for a coil behave like two large magnets which are attracted to each other whenever the coil is energized. Since the coil is energized with alternating current, these magnetic forces of attraction are intermittent in character. Hence, the non-magnetic core structure in the window of a coil and its joints with the yoke members must be strong and rigid enough to resist the pulsating forces of magnetic attraction if the structure is to survive vibration. In high voltage or EHV shunt reactors these forces can become very great indeed. A core strut in the form of a porcelain column will provide the necessary strength and stiffness to resist the compressive forces of the magnetic yoke members, but such a column suffers from the disadvantage that no simple means is known for fastening its ends to the respective yoke members.

Therefore, it is the object of this invention to provide in a reactor a non-magnetic core structure which can be secured to the magnetic yoke members to produce strong and stiff joints.

In brief, an electrical reactor constructed in accordance with the invention comprises at least one coil, a plurality of plates of a non-magnetic, non-conductive material having a high modulus of elasticity such as glass, which plates extend through the window of the coil and beyond its end faces, and a laminated ferromagnetic yoke structure for directing magnetic flux within the coil axially thereof. The ends of the plates projecting from the coil window are interleaved with packets of laminations of the yoke, and the interleaved plates and packets are clamped together by means of through bolts which extend through holes in both the plates and packets. By controlling the clamping forces applied by the bolts it is possible through friction between the contacting surfaces of the plates and packets to provide a stiff joint. If necessary, the rigidity of the reactor structure may be increased by placing a number of plates externally of a coil and clamping their ends between packets of laminations in the way just mentioned.

A clear understanding of the nature of the invention may be had from the description to follow taken with the accompanying drawings, in which.

Figure 1:
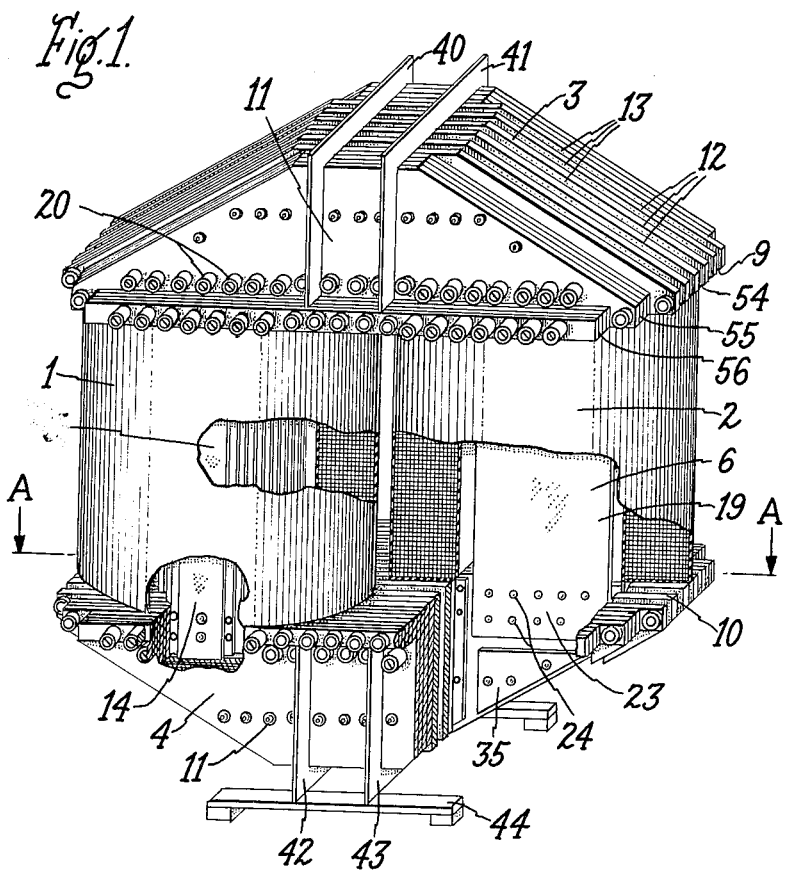
FIG. 1 is a view in perspective of one embodiment of the invention.
Figure 3:
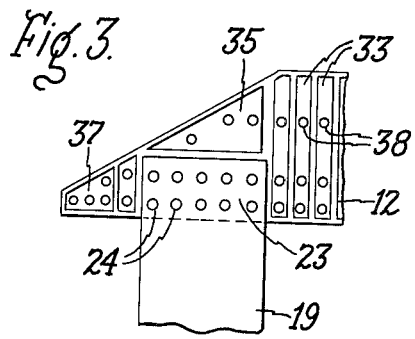
FIG. 3 illustrates the way in which the core plates interleave with the packets of laminations.

In the three sheets of drawings, the figures appear in the following order: FIGS. 1 and 3 on the first sheet, FIGS. 2 and 6 on the second sheet and FIGS. 5 and 4 on the third sheet.

Figure 2:
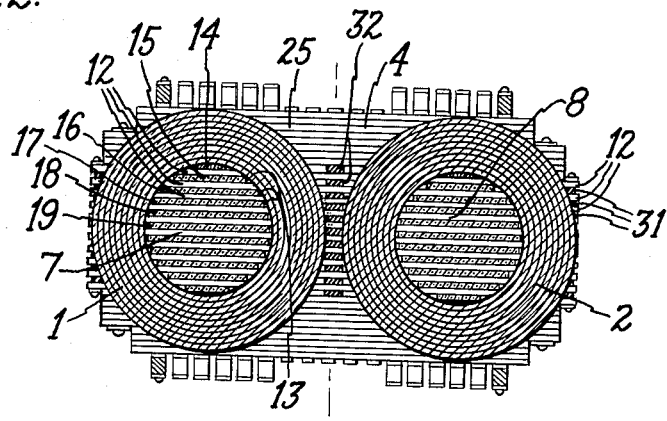
FIG. 2 is a view in section taken on the horizontal plane A—A in FIG. 1.

The reactor structure shown in FIGS. 1 and 2 consists essentially of two coils 1 and 2, two magnetic yokes 3 and 4, two non-magnetic, non-conductive cores 5 and 6, and means for securing these components together. Preferably, the two coils are identical cylindrical shaped units, each having an axial window such as indicated at 7 and 8 through which the cores extend, and the coils are positioned in the reactor structure in reverse end-to-end relation such that the magnetic flux from one coil adds to the flux from the other coil. Each coil may consist of a plurality of disc or pancake coil sections connected in series, and the two coils are connected together electrically to give the flux relationship just mentioned.

As seen in FIG. 1, yokes 3 and 4 are similar. Each yoke is laminated from thin sheets of magnetic steel, and it has a flat surface defined by a long edge of the respective laminations completely overlaying the corresponding end faces of the coils, i.e., yoke 3 has a lower edge surface 9 which overlays the upper end face of coils 1 and 2 and yoke 4 has an upper edge surface 10 which overlays the lower end face of the coils. As shown in FIGS. 1 and 2, the laminations of the yokes extend edgewise to the end faces of the coils and the yokes are at least as wide and preferably somewhat wider than the outer diameter of the coils in the vicinity thereof so that the path of least reluctance for magnetic flux in the coils is in the axial direction into and out of the magnetic yoke and not in a cross direction relative to the axis of the coil, this being true throughout the disc area of the end faces of the coils. In a reactor of this type it is advantageous to keep flux densities relatively low throughout the entire yoke, hence a yoke may incorporate more magnetic steel in its middle region 11 where the total flux is greatest than in other regions where the total flux is not so great. FIG. 1 illustrates a stepped type of yoke wherein a relatively large stack 54 of laminations is sandwiched between two much smaller stacks 55 and these three stacks are between two very small stacks 56. The laminations in stacks 54 and 55 are truncated in plan form while those in stack 56 are rectangular; moreover, the stacks vary in length from 54 the longest to 56 the shortest so as to cover the entire end face of the coil.

The terminal ends of coils 1 and 2 adjacent yoke 3 are connected electrically to the yoke so that the yoke will operate at line potential. This arrangement decreases the amount of insulation necessary between the yoke and coils over that otherwise required. Another advantage of operating yoke 3 hot is that it will now serve as electrostatic shielding for the ends of the coils adjacent the yoke, this being so because the yoke has a comparatively large conductive surface which is at line potential. When yoke 3 is operated at line potential, sharp corners on it should be avoided because corners tend to be sources for corona discharge since the yoke will be at a relatively high potential with respect to the surrounding structure which will be at ground potential. The other terminal ends of coils 1 and 2 may be connected to ground by way of yoke 4.

The laminations of yoke 3 directly over windows 7 and 8 in coils 1 and 2 respectively are divided into a number of packets 12 of laminations, which packets are spaced apart laterally in parallel relation so as to define a space 13 between adjacent packets. Only the laminations in the center portion of yoke covering windows 7 and 8 are divided into packets; the laminations on either side of the windows are not divided into packets in this way. This alternate arrangement of packets and spaces is best illustrated in FIG. 2. Yoke 4 is divided into laterally spaced, parallel packets in exactly the same way, and the spaces in yoke 4 are in axial alignment with corresponding spaces in yoke 3.

Core 5 consists of a plurality of rigid plates 14 to 18, 19 and 18 to 14 of non-magnetic, non-conductive material extending lengthwise through window 7 well into the spaces 13 in both yokes 3 and 4. Actually the upper ends of the plates of core 5 project some distance upward from the upper end face of the coil 1 into the spaces 13 between the packets of laminations in yoke 3, and the lower ends of the plates of core 5 project some distance downward from the lower end face of coil 1 into the spaces 13 between the packets of laminations in yoke 4. In the assembled structure, the plates and packets are interleaved as shown most clearly in FIG. 4. There are two each of plates 14 to 18 and one only of plate 19 in the core construction shown in FIGS. 1 and 2, although only half of them have been designated by the numerals 14 to 19. Since a coil window is usually circular, the plates will appear as parallel chords of the circle (FIG. 2) and will decrease progressively in width from plate 19 at the diameter of the circle to plates 14 at the two shortest chords. Core 6 comprises a similar set of plates 14 to 18, 19 and 18 to 14 which are interleaved with the packets of laminations in the two yokes in exactly the same way.

Yokes 3 and 4 cause the magnetic flux in the coils to assume an axial direction, thereby substantially eliminating the non-axial flux component which interacts with the current flow in the turns of the coil to cause the unwanted effects mentioned earlier in connection with cross fluxing. However, once the non-axial flux component has been removed, the two yokes in effect become big magnets which are now attracted to each other during each current half cycle. Therefore, if a large reactor is not to vibrate severely, even to the extent of destroying itself, very rigid means must be provided for securing the yokes against these pulsating forces of attraction. The purpose of cores 5 and 6 is support for yokes 3 and 4, but to be really effective the cores must be very stiff in compression and they must also be attached very securely to the yokes. Commercial plate glass is probably one of the least expensive and most readily available materials suitable for use in the construction of the type of core described above. It is electrically nonconductive, non-magnetic, rigid, and has a very high modulus of elasticity of the order of 10,000,000 p.s.i. Glass plates approximately one quarter of an inch in thickness interleaved with packets of laminations of about the same thickness will produce a structure satisfactory for most purposes.

Figure 4:
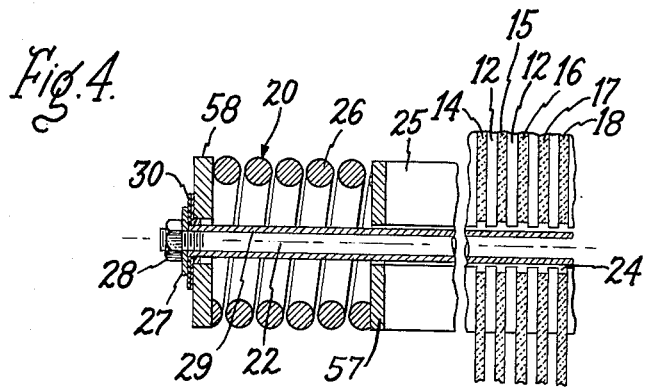
FIG. 4 is an enlarged view in section of the means used for clamping the plates and packets together.

Because glass is a brittle substance certain precautions should be taken in securing a core to the yokes. A satisfactory frictional bond can be obtained between the glass and the steel by clamping the glass plates between the packets of laminations under controlled compressive forces. The two rows of spring loaded bolts indicated generally at 20 and 21 in FIG. 1 provide controlled clamping forces for holding the glass and the metal in frictional engagement, i.e., friction between the glass and the steel secures the plates to the packets. Each clamping device 20 or 21 has a long bolt or stud 22 which passes transversely through the laminations of a yoke and that portion 23 (FIG. 3) of the plates situated between pairs of adjacent packets, the bolt passing through aligned holes 24 in the plates and packets. These holes are large enough to provide substantial clearance between the glass and the insulated shank of the bolt as clearly shown in FIG. 4. The number of bolts passing through any one plate will depend upon the spacing between the bolts and the width of the plate, FIG. 1, illustrating a double row having one to five bolts per row. Both yokes are clamped to the plates in exactly the same way. In FIG. 4 the left-hand end of bolt 22 is shown passing through a number of packets 12, plates 18 to 14, a laminated yoke portion 25 located to one side of the coil window, plate 57, coil spring 26, plate 58, washer 27 and nut 28. The other end of the bolt not shown in FIG. 4 will pass through a number of packets 12, plates 19 to 14, another yoke portion 25 located on the other side of the window, another plate 57, spring 26, plate 58, washer 27 and nut 28 or bolt head. Coil springs 26 are compressed a predetermined amount between plates 57 and 58 by turning down the nuts whereby the springs maintain a predetermined compressive force against the sides of the yoke, which forces hold the laminations together and secure the plates between the packets. Plates 57 distribute the forces applied to the interleaved structure by the springs. In order to prevent the bolts from completing current paths through the steel yoke, each bolt is insulated from the steel structure by means of an insulating sleeve 29 around the shank of the bolt and a pair of insulating washers 30 at both ends of the bolt.

In order to obtain a solid yoke structure spacer members will usually be fitted between the packets in the regions not occupied by the glass plates, such as the spacer members shown at 31 to 37 in FIGS. 2 and 3. Obviously, these spacers should be the same thickness as the glass plates and made of a non-conductive, non-magnetic material such as a hard pressboard. A third row of bolts 38 may be provided to clamp the top portion of the laminations in yoke 3 together, and a similar row of bolts 39 may be provided to clamp the bottom portion of the laminations in yoke 4 together. Bolts 38 and 39 may be ordinary bolts insulated from the magnetic steel, that is, they need not be spring loaded. Wherever possible, the bolts will pass through the spacers as shown in FIG. 3 so that the spacers will be held in a fixed position in the yoke structure. Yokes 3 and 4 may be reinforced by means of braces such as those shown at 40 to 45 in FIG. 1, and the reactor may be supported on a pair of legs 44 and 45.

Figure 6:
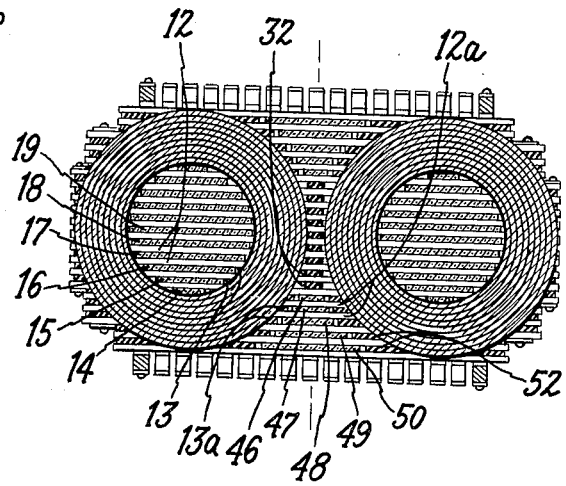
FIG. 6 is a view in section taken on the horizontal plane B—B in FIG. 5.
Figure 5:
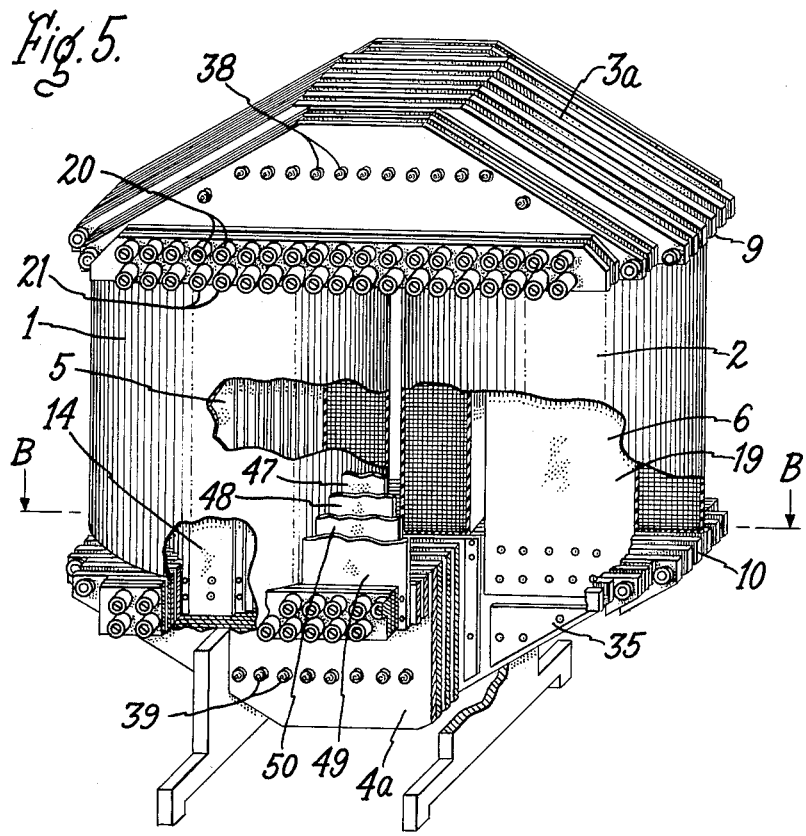
FIG. 5 is a view in perspective of another embodiment of the invention.

In some reactors, it may be advantageous to provide structural support for the yokes in excess of the glass plate cores 5 and 6 shown in FIGS. 1 and 2. This can readily be done by adding non-magnetic, non-conductive plates of a stiff material such as glass to the yoke regions between coils 1 and 2 outside their windows as shown in FIGS. 5 and 6. The FIGS. 5 and 6 structure is the same as the FIGS. 1 and 2 structure except that all of the laminations in both yokes are now divided into parallel packets spaced one from another, that is, the laminations in the yoke portions 25 to the sides of windows 7 and 8 are now divided into packets 12a with spaces 13a therebetween in the same way that the laminations over the windows are divided into spaced, parallel packets of laminations. Plates 46 to 50 of a material such as glass have their end portions interleaved with the packets 12a of the respective yokes and are clamped therebetween in the same way that plates 14 to 19 are interleaved with and clamped between packets 12. Plates 46 to 50 vary in width as shown in FIG. 6 depending upon the space available between the two coils. When plates are fitted outside the windows of the coils, preferably as many plates as possible are used in order to stiffen the structure as much as possible. However, the number of plates may be less than the number the space will accommodate, in which case it will be necessary to provide only as many spaces 13a as plated used. As before, spacers such as 51 and 52 will be fitted in the spaces 13a not occupied by plates 46 to 50.

Since no abnormal forces are acting on the coils, they may be secured to the yoke and core structure in a way known in the art such as by packing them firmly between the yokes.

In the drawings the glass plates shown have been limited to only a few in number in the interest of clarity of the drawings. However, in actual practice, a high voltage shunt reactor constructed in accordance with the invention will have a larger number of glass plates in its structure. The number used in practice will depend upon the physical size of the structure and the magnitude of the forces involved.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. An EHV coreless shunt reactor having a voltage rating of the order of at least 200 kilovolts comprising a substantially cylindrical conductive coil having an axial window therein and a pair of end faces in parallel spaced relation, a pair of laminated magnetic yoke members extending across said coil end faces in substantially parallel spaced relation with the yoke laminations in edgewise relation to the planes of said end faces, an axial column formed entirely of high reluctance material and extending through said coil window between said yoke members, said column comprising a plurality of rigid plates of non-magnetic non-conductive material extending in parallel spaced relation through and beyond said coil window and into interleaved relation with both said laminated yoke members, and means clamping the interleaved portions of said laminations and plates in firm frictional relation thereby to provide a rigid coil and yoke structure.

2. An electrical reactor comprising a pair of coils placed side-by-side; a pair of laminated yokes of magnetic material for completing low reluctance magnetic flux paths between corresponding ends of said coils with the flux entering and leaving a yoke through an edge surface thereof, said yokes having their laminations separated into a plurality of packets of laminations spaced one from another; a plurality of rigid plates of non-magnetic, non-conductive material extending through the window in each coil between said yokes into the spaces between said packets in interleaved relation therewith; and means for clamping together firmly the interleaved portions of said plates and said packets of laminations.

3. A reactor as defined in claim 1 wherein said rigid plates are plates of glass and said clamping means comprises a plurality of spring-loaded transverse bolts each adapted to apply compressive force of predetermined limited magnitude.

4. An electrical reactor comprising a pair of similar coils positioned side-by-side in spaced, parallel relation with each pair of corresponding end faces of the coils in a common plane, a laminated yoke of magnetic material positioned across each pair of said corresponding end faces of the coils for directing the magnetic flux induced in the coils axially thereof into said yokes, each of said laminated yokes having an edge surface thereof overlaying said pair of corresponding end faces of the coils in closely spaced relation and having its laminations divided into a plurality of packets of laminations spaced one from another, the spaces between the packets of laminations in one yoke being in alignment with corresponding spaces between the packets in the other yoke; a plurality of rigid plates of non-magnetic, non-conductive material extending between said yokes into the spaces between said packets in interleaved relation therewith; and means for clamping together firmly the interleaved portions of said plates and said packets of laminations.

5. The reactor defined in claim 4 wherein said rigid plates extend through the window in each of said coils.

6. The reactor defined in claim 4 wherein some of said rigid plate members extend through the window in each of said coils and some of said plates extend from one yoke to the other yoke externally of said coils.

7. The reactor defined in claim 4 wherein said rigid plates are plates of glass.

8. The reactor defined in claim 4 wherein said rigid plates are plates of glass and said clamping means comprises a plurality of insulated, spring loaded bolts which pass through aligned, transverse holes in said plates and said packets in the interleaved regions thereof, said spring cooperating with said bolts to apply a predetermined compressive force to the stack of plates and laminations.

References Cited by the Examiner

UNITED STATES PATENTS

| | | | |
|---|---|---|---|
| 3,132,318 | 5/1964 | Kiltie | 336—219 X |
| 3,195,082 | 7/1965 | Wetherill et al. | 336—210 X |
| 3,195,083 | 7/1965 | Wetherill | 336—210 X |
| 3,195,087 | 7/1965 | Welch | 336—210 X |

LARAMIE E. ASKIN, *Primary Examiner.*

ROBERT K. SCHAEFER, *Examiner.*

T. J. KOZMA, *Assistant Examiner.*